(12) United States Patent  
Gameiro et al.

(10) Patent No.: US 10,208,669 B2  
(45) Date of Patent: Feb. 19, 2019

(54) METHOD AND DEVICE FOR REGULATING THE COOLING OF OIL IN A TURBOMACHINE

(71) Applicant: SNECMA, Paris (FR)

(72) Inventors: Sebastien Gameiro, Paris (FR); Brice Andre, Montgeron (FR); Guillaume Mathon Margueritte, Paris (FR); Nicolas Potel, Maisons Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 571 days.

(21) Appl. No.: 14/770,681

(22) PCT Filed: Feb. 24, 2014

(86) PCT No.: PCT/FR2014/050382  
§ 371 (c)(1),  
(2) Date: Aug. 26, 2015

(87) PCT Pub. No.: WO2014/131973  
PCT Pub. Date: Sep. 4, 2014

(65) Prior Publication Data  
US 2016/0003148 A1   Jan. 7, 2016

(30) Foreign Application Priority Data  
Feb. 27, 2013   (FR) ...................................... 13 51733

(51) Int. Cl.  
*F02C 7/14* (2006.01)  
*F02C 7/224* (2006.01)

(52) U.S. Cl.  
CPC ................ *F02C 7/14* (2013.01); *F02C 7/224* (2013.01); *Y02T 50/675* (2013.01)

(58) Field of Classification Search  
CPC ........... F02C 7/14; F02C 7/224; Y02T 50/675  
(Continued)

(56) References Cited

U.S. PATENT DOCUMENTS 2,865,580 A    12/1958 Marshall  
3,300,965 A    1/1967 Sherlaw et al.  
(Continued)

FOREIGN PATENT DOCUMENTS

FR    2 951 228    4/2011  
FR    2 969 701    6/2012  
(Continued)

OTHER PUBLICATIONS

Combined Office Action and Search Report dated Jun. 22, 2017 in Russian Patent Application No. 2015141085/06(063266) (with English translation of Office Action and English translation of categories of cited documents).

(Continued)

*Primary Examiner* — Mark Laurenzi  
*Assistant Examiner* — Paul Thiede  
(74) *Attorney, Agent, or Firm* — Oblon, McClelland, Maier & Neustadt, L.L.P.

(57) ABSTRACT

A method for regulating oil cooling within an oil cooling device of a turbomachine including a first heat exchanger mounted in series with a second heat exchanger, the first heat exchanger being an oil/air exchanger while the second heat exchanger is an oil/fuel exchanger, each heat exchanger having an oil inlet and an oil outlet, a bypass directly connecting the oil inlet of the first heat exchanger to the oil outlet of the first heat exchanger, and a flow regulator to regulate the flow rate of oil flowing through the bypass. Circulation of oil though the bypass is allowed by means of the flow regulator when the oil temperature is less than or equal to a predetermined temperature comprised between 70° C. and 90° C., preferably equal to about 80° C.

8 Claims, 2 Drawing Sheets

(58) Field of Classification Search
USPC .......................................... 415/178; 60/772
See application file for complete search history.

(56) References Cited

U.S. PATENT DOCUMENTS

| | | |
|---|---|---|
| 2009/0313999 A1 | 12/2009 | Hunter et al. |
| 2011/0232293 A1 | 9/2011 | Leese |
| 2014/0223917 A1 | 8/2014 | Gameiro et al. |

FOREIGN PATENT DOCUMENTS

| | | |
|---|---|---|
| RU | 1451292 A1 | 1/1989 |
| RU | 2 315 880 C2 | 1/2008 |

OTHER PUBLICATIONS

International Search Report dated Jul. 21, 2014 in PCT/FR2014/050382 Filed Feb. 24, 2014.
U.S. Appl. No. 14/343,185, filed Mar. 6, 2014, 2014-0223917, Gameiro, et al.
U.S. Appl. No. 14/770,681, filed Aug. 26, 2015, Gameiro, et al.

METHOD AND DEVICE FOR REGULATING THE COOLING OF OIL IN A TURBOMACHINE

FIELD OF THE INVENTION

The invention relates to a method for regulating oil cooling and an oil cooling device for a turbomachine, and more particularly a method for regulating oil cooling and a device for cooling in a turbomachine which includes two heat exchangers.

The term "turbomachine" refers to all gas turbine devices producing driving power, among which are distinguished in particular the turbojets supplying the necessary thrust for jet propulsion by high-speed ejection of hot gases, and turboshaft engines wherein driving power is supplied by rotation of an engine shaft. For example, turboshaft engines are used as engines for helicopters. Turboprop engines (turbine engines driving a propeller) are turbine engines used as airplane engines.

STATE OF THE PRIOR ART

An oil cooling device for a turbomachine is known that includes a first heat exchanger mounted in series with a second heat exchanger, the first heat exchanger being an oil/air exchanger while the second heat exchanger is an oil/fuel exchanger.

In this type of cooling device, when the air is particularly cold and the turbomachine is operating at high power, for instance during takeoff, the oil reaches extremely low temperatures through the first exchanger. This has the drawback of cooling the fuel when it is rather necessary to heat it. Furthermore, if water were present in the fuel, this water could freeze and form ice crystals which would block the fuel supply circuit, particularly the servo-valves, and bring about problems with the operability of the turbine engine.

It is known to install a bypass directly connecting the oil inlet of the first heat exchanger to the oil outlet of the first heat exchanger, said bypass being equipped with a safety pressure valve to divert oil through the bypass in the event of overpressure. This type of pressure valve is configured to allow oil to circulate only through the bypass, and this at its maximum rate of flow (i.e. nominal head loss of the valve is zero), when the ratio between the nominal head loss of the first heat exchanger and the effective head loss between the oil inlet and the oil outlet of the first heat exchanger is less than or equal to 0.5. In other words, when the nominal head loss of the first heat exchanger is 0.2 MPa (megapascal) (i.e. 2 bars), the valve opens when the effective head loss (pressure difference between the inlet and the outlet of the first heat exchanger) is greater than or equal to 0.4 MPa (i.e. 4 bars). Such an overpressure occurs when the first heat exchanger is fouled or blocked. This pressure valve operates only as a safety valve to avoid any damage caused by an overpressure.

However, when the air is particularly cold, the safety pressure valve does not open. The oil passes through the first exchanger and reaches temperatures that are too cold to allow the necessary heating of the fuel.

PRESENTATION OF THE INVENTION

One aim of the present invention is to correct, at least substantially, the shortcomings mentioned above.

The invention achieves this aim by proposing a method for regulating oil cooling within a turbomachine oil cooling device including a first heat exchanger mounted in series with a second heat exchanger, the first heat exchanger being an oil/air exchanger while the second exchanger is an oil/fuel exchanger, each heat exchanger having an oil inlet and an oil outlet, a bypass directly connecting the oil inlet of the first heat exchanger to the oil outlet of the first heat exchanger, and a flow regulator to regulate the flow of oil flowing through the bypass, wherein oil circulation is allowed through the bypass using the flow regulator when the temperature of the oil is less than or equal to a predetermined temperature comprised between 70° C. (seventy degrees Celsius) and 90° C. (ninety degrees Celsius), preferably equal to about 80° C. (eighty degrees Celsius).

Of course, in the cooling device, the first and second heat exchangers being positioned within a closed oil circuit, the first exchanger can be positioned upstream or downstream of the second exchanger with respect to a reference point in the circuit with respect to the direction of oil flow within the oil cooling device, the oil circulating from upstream to downstream.

It is therefore understood that when the oil has a temperature that is less than the predetermined temperature, the flow regulator is actuated so that the oil flows preferentially through the bypass. Unlike the known state of the art, as the oil is not required to attain a predetermined dynamic pressure to be able to pass through the bypass, it is avoided that a portion of the oil passes through the first heat exchanger anyway, due to the dynamic pressure attained to activate the first valve. Thus, by activating the flow regulator depending on the temperature, no pressure constraint is exerted on the oil, which ensures that the oil circulates preferentially through the bypass rather than through the first heat exchanger, the latter having a resistance to oil flow greater than that of the bypass and the flow regulator (for example, a tube equipped with an open valve).

The inventors noted with surprise that it is only when the temperature of the oil becomes greater than the predetermined temperature that the fuel need not have priority for heating. In other words, the inventors have noted with surprise that the fuel must have priority for heating (i.e. oil is allowed to circulate through the bypass) only when the temperature of the oil is less than the predetermined temperature.

Preferentially, when the oil temperature is less than the predetermined temperature, the flow regulator is controlled so that its head loss is less than or equal to 0.2 MPa (i.e. 2 bars), preferably 0.1 MPa (i.e. 1 bars) so that more than 95% of the oil circulates through the bypass while less than 5% of oil circulates through the first heat exchanger. Such a configuration is especially advantageous and makes it possible to ensure that the oil is not cooled by the first heat exchanger when the temperature of the oil is less than the predetermined temperature.

Advantageously, circulation of oil through the bypass is also allowed when the ratio between the nominal head loss of the first heat exchanger and the effective head loss between the oil entry and the oil outlet of the first heat exchanger is less than or equal to a predetermined ratio comprised between 0.7 and 0.9, preferably equal to about 0.8.

Recall that in a hydraulic circuit, the head loss corresponds to the difference in pressure between two points of said circuit. The head loss represents the resistances encountered by the fluid in circulating between these two points.

Recall likewise that the value of a parameter is called "nominal" when it corresponds to the theoretical value provided by the builder. For example, a nominal head loss of 0.2 MPa of a heat exchanger means that said heat exchanger is designed to operate correctly (i.e. optimum heat exchange) when the head loss between the inlet and the outlet of said exchanger is 0.2 MPa, or in other words that it generates a head loss of 0.2 MPa in normal operation.

The value of a parameter that is called "effective" is the value that this parameter takes on at a given instant and/or in a given configuration.

When the oil is not yet warm, that is when the temperature of the oil is greater than the predetermined temperature but less than a hot temperature comprised between 110° C. (one hundred ten degrees Celsius) to 130° C. (one hundred thirty degrees Celsius), preferably equal to about 120° C. (one hundred twenty degrees Celsius), it is not necessary to use the entire cooling capacity of the first heat exchanger, and thus to cause all the oil to circulate through the first heat exchanger. Indeed, when the temperature of the oil is comprised between the predetermined temperature and the hot temperature the cooling needs of the oil are not a maximum. The predetermined ratio makes it possible to achieve such regulation by allowing the oil to also circulate through the bypass under these conditions.

When the temperature of the oil is comprised between the predetermined temperature and the hot temperature its viscosity is greater that when its temperature is greater than or equal to the hot temperature. Thus, when the temperature of the oil is less than the hot temperature, the effective head loss between the oil inlet and outlet of the first heat exchanger is greater than the same head loss when the temperature of the oil is greater than the hot temperature. The predetermined ratio is representative of this effective head loss difference, and thanks to this parameter an adequate quantity of oil can be diverted into the bypass based on this difference in effective head loss.

This also makes it possible to use a first heat exchanger having a high nominal head loss, for example greater than 0.4 MPa. Such heat exchangers have the advantage of being especially effective when the temperature of the oil is greater than the hot temperature (i.e. oil cooling is improved when the oil is hot). Moreover, such heat exchangers have the advantage of opposing even more resistance to flow when the oil is cold, which makes it possible to divert the oil even more easily through the bypass when the temperature of the oil is less than the predetermined temperature. Nevertheless such heat exchangers increase the overall effective head loss of the cooling device, while it is advantageous to hold this head loss as low as possible. Allowing the circulation of oil through the bypass when the ratio is smaller than the predetermined ratio also makes it possible to reduce the overall effective head loss of the cooling device when the temperature of the oil is comprised between the predetermined temperature and the hot temperature, that is when the maximum fluidity of the oil has not yet been reached.

Advantageously, the flow rate of oil circulating through the bypass when the ratio is less than or equal to the predetermined ratio while the temperature of the oil is greater than the predetermined temperature is less than the flow rate of oil circulating through the bypass when the temperature of the oil is less than the predetermined temperature.

This makes it possible to provide intermediate cooling of the oil when its temperature is comprised between the predetermined temperature and the hot temperature. In other words, more oil circulates in the bypass (and is therefore not cooled) when the temperature of the oil is less than the predetermined temperature than when the temperature of the oil is comprised between the predetermined temperature and the hot temperature. This makes it possible to carry out cooling that is adapted to the temperature of the oil when its temperature is comprised between the predetermined temperature and the hot temperature.

Advantageously, the circulation of oil is blocked from circulating through the bypass by means of the flow regulator when the temperature of the oil is greater than the predetermined temperature while the ratio is greater than the predetermined ratio.

Under these conditions, it is ensured that all the oil circulates through the first heat exchanger, and therefore that cooling is a maximum when the oil is hot (temperature greater than the hot temperature). In addition, if the oil pressure becomes too high (the ratio then becoming smaller than the predetermined ratio), for example in the event of fouling of the first heat exchanger, the flow regulator allows oil to flow partly through the bypass. Thus, the regulator also acts as a safety valve to prevent overpressure hazards.

The invention also relates to a turbomachine oil cooling device including a first heat exchanger mounted in series with a second heat exchanger, the first heat exchanger being an oil/air exchanger while the second heat exchanger is an oil/fuel exchanger, each exchanger having an oil inlet and an oil outlet, a bypass directly connecting the oil inlet of the first heat exchanger to the oil outlet of the first heat exchanger, and a flow regulator to regulate the flow rate of oil flowing through the bypass, the flow regulator including a thermal valve, said thermal valve being configured to be open when the temperature of the oil is less than a predetermined temperature comprised between 70° C. (seventy degrees Celsius) and 90° C. (ninety degrees Celsius), preferably equal to about 80° C. (eighty degrees Celsius).

It is understood that a thermal valve is a valve the opening whereof is controlled according to temperature. For example, such a valve can be controlled by an external motor which is activated depending on the temperature of the oil measured by a sensor. According to another example, the valve is connected to a member that is sensitive to heat and which dilates because of it, the plug of the valve switching because of this from a closed position to an open position and vice versa depending on the temperature of the oil. It is understood that the open, closed or intermediate position between the open position and the closed position is independent of the pressure exerted by the oil. Thus, such a valve can be open or closed no matter what pressure is exerted by the oil. This has the advantage of minimizing the nominal head loss of the flow regulator and directing a maximum amount of oil into the bypass when the thermal valve is opened (partially or totally).

It is therefore understood that the thermal valve is closed when the temperature us higher than the predetermined temperature, and is at least partially open when the temperature is less than or equal to the predetermined temperature. Preferably, the valve is totally open when the temperature of the oil is 10° C. less than the predetermined temperature.

Advantageously, the nominal head loss when the thermal valve is open is at most equal to 10% of the nominal head loss of the first heat exchanger. This therefore ensures that a minimum of 85% to 95% of the oil circulates through the bypass when the thermal valve is open.

Advantageously, the flow regulator includes a pressure valve (or differential pressure valve or differential valve), said pressure valve being configured to be open when the ratio between the nominal head loss of the first heat exchanger and the effective head loss between the oil inlet and the oil outlet of the first heat exchanger is less than or equal to a predetermined ratio comprised between 0.7 and 0.9, preferably equal to about 0.8.

It is understood that a pressure valve is a valve the opening and closing whereof are controlled based on pressure. For example, the valve tends to be closed due to the forces generated by elastic deformations of an element of the valve or of an element connected to the valve. These forces oppose the dynamic pressure (or flow pressure) exerted by the oil on the valve when the oil circulates. Thus, when the dynamic pressure of the oil attains the predetermined pressure, said dynamic pressure is sufficient to displace and open the valve. The more the dynamic pressure rises, the more the valve has a tendency to open, and this up to the completely open position of the valve (or maximum opening). When the dynamic pressure drops, the valve closes again.

According to one variant, the thermal valve and the pressure valve form one single valve, the opening whereof depends on the temperature and on the effective head loss. According to another variable, the flow regulator includes two independent valves, to wit a thermal valve and a pressure valve, mounted in parallel.

The invention also relates to a turbomachine including an oil cooling device according to the invention.

BRIEF DESCRIPTION OF THE DRAWINGS

The invention and its advantages will be better understood upon reading the detailed description made hereafter of one embodiment of the invention, given by way of a non-limiting example. This description refers to the appended figure pages, wherein.

DETAILED DESCRIPTION OF EMBODIMENTS

Figure 1:
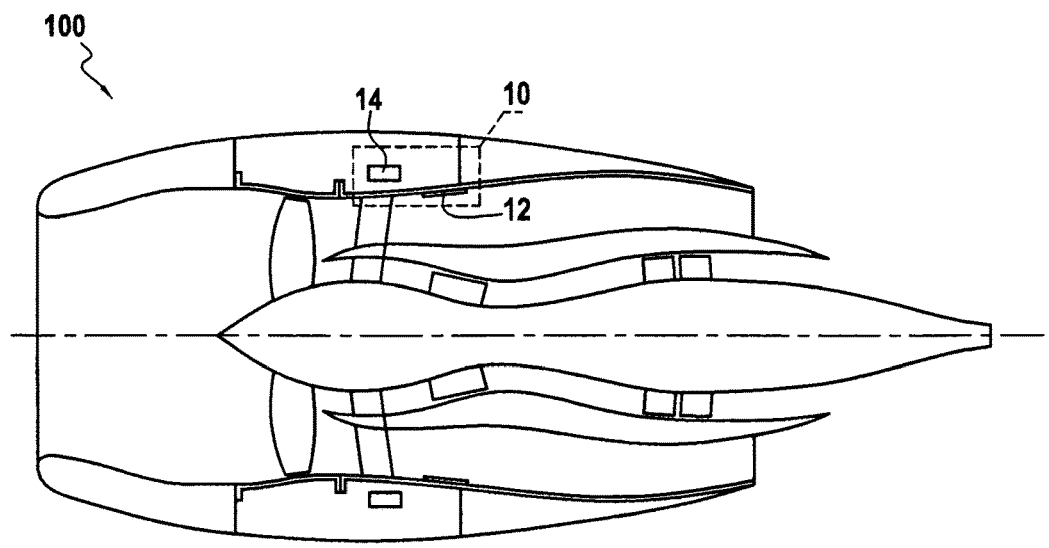
FIG. 1 shows a turbojet equipped with a cooling device according to the invention.

FIG. 1 shows a turbomachine 100, and more particularly an airplane turbojet engine 100, including an oil cooling device 10. This cooling device 10 includes a first heat exchanger 12, this first heat exchanger 12 being an oil/air heat exchanger, and a second heat exchanger 14, this second heat exchanger 14 being an oil/fuel heat exchanger.

Figure 2:
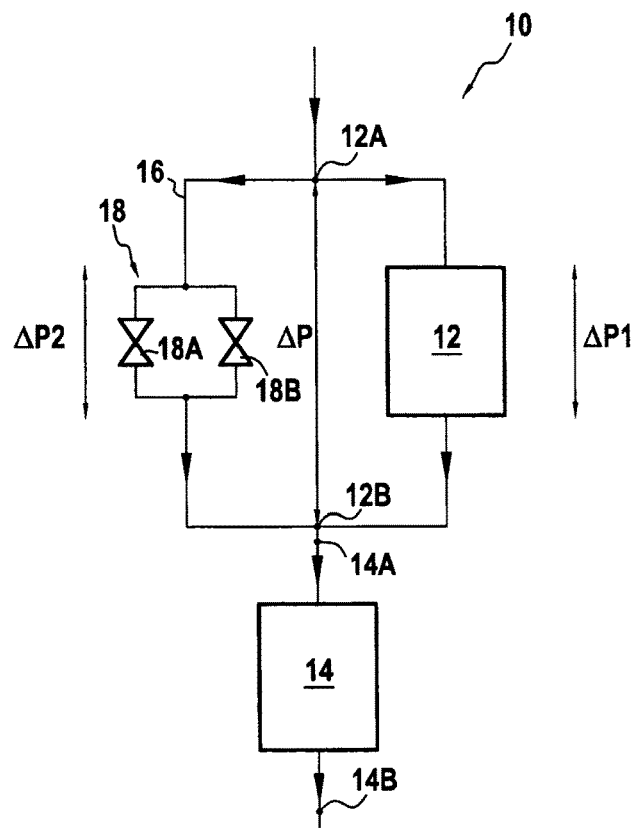
FIG. 2 shows schematically the cooling device of FIG. 1.

The cooling device 10 is shown partially in FIG. 2. The direction of the thicker arrows indicates the direction in which oil circulates within the cooling device 10. The first exchanger 12 includes an oil inlet 12A and an oil outlet 12B. The second exchanger 14 includes an oil inlet 14A and an oil outlet 14B. The oil outlet 12B of the first exchanger 12 is connected to the oil inlet 14A of the second exchanger 14, so that the first exchanger 12 and the second exchanger 14 are assembled in series. Of course, the exchangers 12 and 14 can be mounted in series directly or indirectly, or even in the reverse order. In this example they are assembled in series directly.

The cooling device 10 also includes a bypass 16 which directly connects the oil inlet 12A of the first exchanger 12 with the oil outlet 12B of the first exchanger 12. The bypass 16 is equipped with a flow regulator 18 allowing the flow rate of the oil circulating through the bypass 16, from the inlet 12A to the outlet 12B, to be regulated.

The flow regulator 18 includes a thermal valve 18A and a pressure valve 18B assembled in parallel. These valves 18A and 18B are conventional valves known to a person skilled in the art. The maximum opening cross-section is greater than the maximum opening cross-section of the pressure valve, so that the maximum flow rate allowed by the thermal valve is greater than the maximum flow rate allowed by the pressure valve.

When the oil is cold, that is when its temperature is less than a predetermined temperature, which is 80° C. in this illustrative example, the oil is allowed to circulate through the bypass 16 thanks to the flow regulator 18. The thermal valve 18A is then opened. According to different variants, either the thermal valve 18A is controlled to open (by a solenoid valve for example) or it opens automatically (by a thermostat for example).

When the thermal valve 18A is open, the nominal head loss ΔP1 of the first heat exchanger 12 is much higher than the nominal head loss ΔP2 of the flow regulator 18. In this example, the nominal head loss ΔP2 of the flow regulator 18 when the thermal valve 18A is open is at least 10 times lower than the head loss of the heat exchanger 12. Thus, the first heat exchanger 12 has a higher resistance to flow than that of the bypass 16 and of the flow regulator 18, so that more than 95% of the oil flows through the bypass 16 while less than 5% of the oil flows through the first heat exchanger 12.

When the temperature of the oil is greater than 80° C., the thermal valve 18A is closed. Thus, according to different variants, either the thermal valve 18A is controlled to close (for example by a solenoid valve) or it closes automatically (by a thermostat for example).

When the oil temperature is greater than 80° C. but less than the hot temperature, 120° C. in this illustrative example, the viscosity of the oil is such that the effective head loss ΔP between the oil inlet 12A and the oil outlet 12B can be greater than the nominal head loss ΔP1 of the first heat exchanger 12.

Under these conditions, when the ratio R between the nominal head loss ΔP1 of the first heat exchanger 12 and the effective head loss ΔP between the oil inlet 12A and the oil outlet 12B (R=ΔP1/ΔP) becomes less than or equal to a predetermined ratio, which is 0.8 in this illustrative example, the pressure valve 18B is opened. According to different variants, either the pressure valve 18B is controlled to open (by a solenoid valve for example) or it opens automatically (a spring-loaded valve for example).

In other words, the pressure valve 18B is configured to be open when the effective head loss ΔP=ΔP1/R. In this illustrative example, the nominal head loss of the first heat exchanger 12 is equal to 0.4 MPa (4 bars). Consequently, in this illustrative example, the pressure valve 18B is configured to be open when the effective head loss ΔP is greater than or equal to 0.5 MPa (5 bars). The transition from the totally closed position to the totally open position can be more or less progressive. For example, the pressure valve 18B is closed when the effective pressure difference ΔP is less than 0.5 MPa, totally open when the effective difference in pressure ΔP is greater than or equal to 0.6 MPa (6 bars) and partly open when the effective difference in pressure ΔP is comprised between 0.5 and 0.6 MPa, in this illustrative, non-limiting example.

In this illustrative example, the nominal head loss ΔP2 of the flow regulator when the thermal valve 18A is closed while the pressure valve 18B is completely open is 0.6 MPa. Thus, in this illustrative example, when the thermal valve 18A is closed while the pressure valve 18B is completely open, 30% of the oil passes through the bypass 16 while 70% of the oil passes through the first heat exchanger 12.

In this illustrative example, the temperature of the oil is greater than 80° C. and the ratio R is greater than 0.8, the thermal valve 18A and the pressure valve 18B are closed. Likewise, in this illustrative example, when the temperature of the oil is greater than 120° C. under normal conditions—an abnormal condition being for example fouling of the first heat exchanger causing an overpressure—the flow regulator 18 is controlled and/or configured so that the thermal valve 18A and the pressure valve 18B remain closed. In both cases, the oil does not circulate through the bypass 16 while 100% of the oil circulates through the first heat exchanger 12. According to different variants, to close the pressure valve 18B, either the pressure valve 18B is controlled to close (by a solenoid valve for example) or it closes automatically (a spring valve for example).

Figure 3:
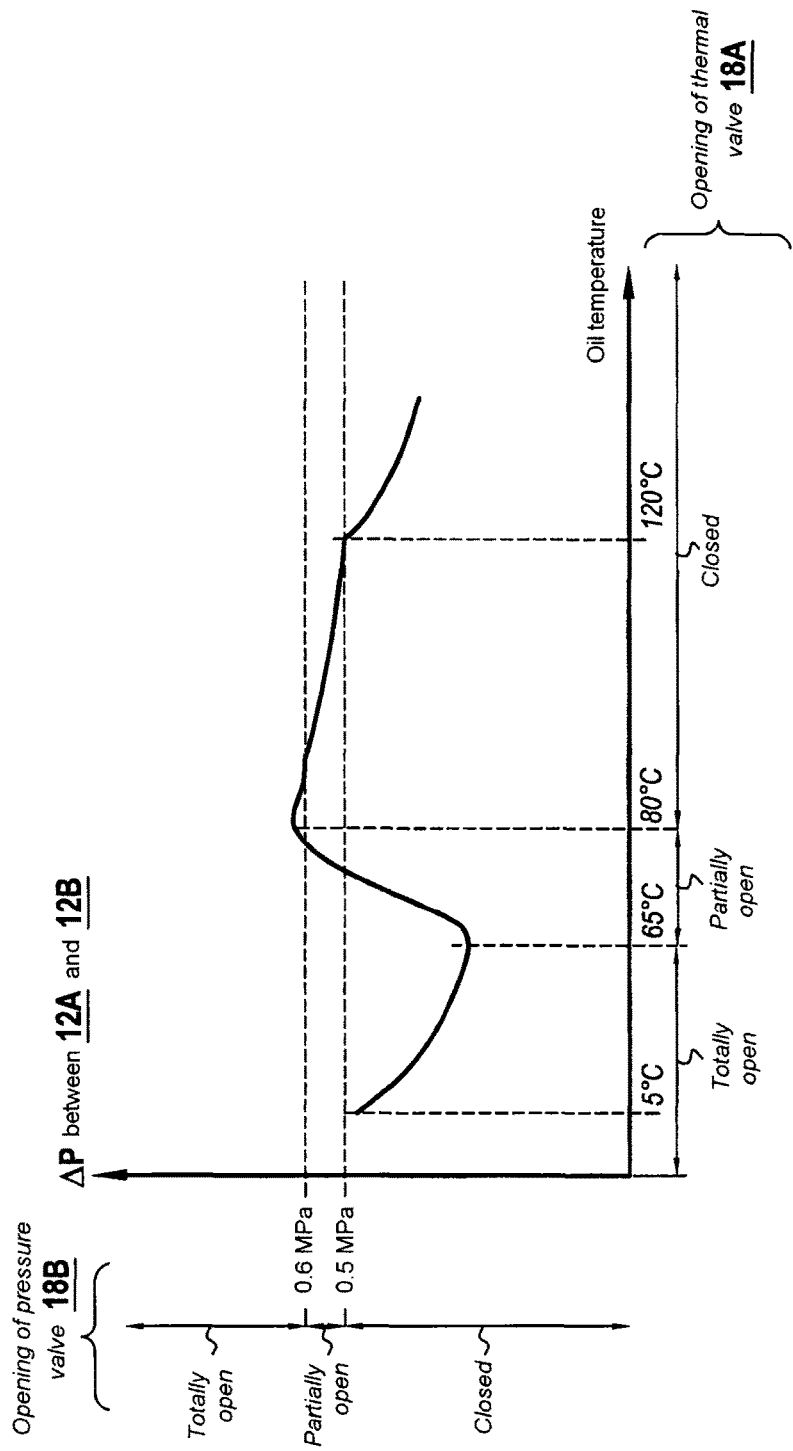
FIG. 3 shows the change in the head loss between the oil inlet and outlet of the first heat exchanger depending on the temperature of the oil.

FIG. 3 shows the change in the effective head loss ΔP depending on the oil temperature for the illustrative example discussed above. Other embodiments of the present invention which are not shown may have a different predetermined temperature and a different predetermined ratio than in the illustrative example shown in FIG. 3.

In the illustrative example shown in FIG. 3, when the turbomachine 100 is operating in a particularly cold environment (air temperature −30° C. for example) while the turbomachine is operating at high power (takeoff for example), the temperature of the oil is less than the predetermined temperature and therefore the thermal valve 18A is completely open. The effective head loss ΔP between the oil inlet 12A and the oil outlet 12B is essentially due to the viscosity of the oil. The oil having a tendency to heat up gradually as the turbomachine 100 operates, it becomes more and more fluid, due to which the effective head loss ΔP falls. In the illustrative example shown in FIG. 3, when the oil reaches a temperature of 65° C., the thermal valve 18A begins to close, the valve 18A being completely closed at 80° C. Thus, between 65° C. and 80° C., the increase in the in the effective head loss ΔP is essentially due to closure of the thermal valve 18A, even though the fluidity of the oil continues to increase.

In the illustrative example shown in FIG. 3, it is noted that during closure of the thermal valve 18A, the effective head loss ΔP (which is equal to ΔP1/R, in which ΔP1 is the nominal head loss of the first heat exchanger 12 and R is a predetermined ratio, as discussed earlier) becomes greater than 0.5 MPa, so that the pressure valve 18B begins to open. In the illustrative example shown in FIG. 3, when the effective head loss ΔP reaches and exceeds 0.6 MPa, the pressure valve 18B is completely open. Thus, in the illustrative example shown in FIG. 3, when the oil has a temperature of 80° C., the thermal valve 18A is closed while the pressure valve 18B is completely open.

As the turbomachine 100 continues to operate in the illustrative example shown in FIG. 3, the temperature and the fluidity of the oil continue to increase so that the effective head loss ΔP decreases. When the effective head loss ΔP becomes less than 0.6 MPa, the pressure valve 18B begins to close, as indicated by the "plateau" on the curve between 80° C. and 120° C. Then the head loss ΔP continues to drop due to the fluidity of the oil, which is increasing, as a result of which the pressure valve 18B closes progressively.

When the oil reaches 120° C. in the illustrative example shown in FIG. 3, the effective head loss ΔP again becomes less than 0.5 MPa, so that the pressure valve 18B closes completely. It is noted that above 120° C., the effective head loss ΔP continues to decrease, essentially due to the fluidity of the oil which is increasing.

We note that if an impurity or fouling were to block the first heat exchanger 12 while the thermal valve 18A and the pressure valve 18B are closed, then when the effective head loss ΔP becomes greater than 0.5 MPa and the pressure valve 18B is opened, it would also serve as a safety valve.

Although the present invention has been described by referring to specific embodiments, it is evident that modifications and changes can be carried out on these examples without departing from the general scope of the invention as defined in the claims. In particular, the individual features of the different embodiments illustrated/mentioned can be combined into additional embodiments. Consequently, the description and the drawings must be considered illustrative rather than restrictive.

In addition, all the features related to the method(s) described are transposable to the device(s) described, and conversely all the features relating to the device(s) described are transposable to the method(s) described.

The invention claimed is:

1. A method for regulating oil cooling within an oil cooling device of a turbomachine including a first heat exchanger mounted in series with a second heat exchanger, the first heat exchanger being an oil/air exchanger and the second heat exchanger being an oil/fuel exchanger, each heat exchanger having an oil inlet and an oil outlet, a bypass directly connecting the oil inlet of the first heat exchanger to the oil outlet of the first heat exchanger, and a flow regulator to regulate a flow rate of oil flowing through the bypass, the flow regulator including a thermal valve and a pressure valve arranged in parallel, the method comprising:

opening the thermal valve when temperature of the oil is less than or equal to a predetermined temperature comprised between 70° C. and 90° C. so that the oil circulates through the bypass;

opening the pressure valve when a ratio between a nominal head loss of the first heat exchanger and an effective head loss between the oil inlet and the oil outlet of the first heat exchanger is less than or equal to a predetermined ratio comprised between 0.7 and 0.9 so that the oil circulates through the bypass; and closing the thermal valve when the temperature of the oil is greater than the predetermined temperature and closing the pressure valve when the ratio is greater than the predetermined ratio so that the oil circulates through the first heat exchanger.

2. The method according to claim 1, wherein the flow rate of oil circulating through the bypass when the ratio is less than or equal to the predetermined ratio and the temperature of the oil is greater than the predetermined temperature is less than the flow rate of oil circulating through the bypass when the temperature of the oil is less than the predetermined temperature.

3. The method according to claim 1, wherein the predetermined temperature is equal to 80° C.

4. The method according to claim 1, wherein the predetermined ratio is equal to 0.8.

5. An oil cooling device for a turbomachine comprising:

a first heat exchanger mounted in series with a second heat exchanger, the first heat exchanger being an oil/air exchanger and the second heat exchanger being an oil/fuel exchanger, each heat exchanger having an oil inlet and an oil outlet;

a bypass directly connecting the oil inlet of the first heat exchanger to the oil outlet of the first heat exchanger; and a flow regulator to regulate a flow rate of oil flowing through the bypass, wherein the flow regulator includes a thermal valve which is open when an oil temperature is less than a predetermined temperature comprised between 70° C. and 90° C., and which is closed when the oil temperature is greater than the predetermined temperature, and a pressure valve arranged in parallel with the thermal valve, the pressure valve is open when a ratio between a nominal head loss of the first heat exchanger and an effective head loss between the oil inlet and the oil outlet of the first heat exchanger is less than or equal to a predetermined ratio comprised between 0.7 and 0.9, and which is closed when the ratio is greater than the predetermined ratio.

6. A turbomachine including an oil cooling device according to claim 5.

7. The device according to claim 5, wherein the predetermined temperature is equal to 80° C.

8. The device according to claim 5, wherein the predetermined ratio is equal to 0.8.

* * * * *

UNITED STATES PATENT AND TRADEMARK OFFICE
CERTIFICATE OF CORRECTION

PATENT NO.        : 10,208,669 B2
APPLICATION NO.   : 14/770681
DATED             : February 19, 2019
INVENTOR(S)       : Sebastien Gameiro et al.

Page 1 of 1

It is certified that error appears in the above-identified patent and that said Letters Patent is hereby corrected as shown below:

On the Title Page

Item (71), the Applicant's information is incorrect. Item (71) should read:
--(71) Applicant: SAFRAN AIRCRAFT ENGINES, Paris (FR)--

Signed and Sealed this
Fourteenth Day of April, 2020

Andrei Iancu
*Director of the United States Patent and Trademark Office*